(12) United States Patent
Hoshuyama (10) Patent No.: US 7,327,876 B2
(45) Date of Patent: Feb. 5, 2008

(54) IMAGE PROCESSING DEVICE (75) Inventor: Hideo Hoshuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 239 days.

(21) Appl. No.: 09/987,680

(22) Filed: Nov. 15, 2001

(65) Prior Publication Data

US 2002/0085750 A1    Jul. 4, 2002

(30) Foreign Application Priority Data

Nov. 16, 2000   (JP) ............................. 2000-349071

(51) Int. Cl.
G06K 9/00 (2006.01)
G06K 9/40 (2006.01)
H04N 5/228 (2006.01)

(52) U.S. Cl. .................... 382/167; 382/274; 348/222.1

(58) Field of Classification Search ................ 382/167, 382/274; 358/518, 523; 348/222.1, 223.1
See application file for complete search history.

(56) References Cited

U.S. PATENT DOCUMENTS

| | | | | |
|---|---|---|---|---|
| 5,181,105 A | * | 1/1993 | Udagawa et al. ........... | 358/520 |
| 5,196,923 A | * | 3/1993 | Ueda et al. ................. | 348/647 |
| 5,510,850 A | * | 4/1996 | Ueda et al. ................. | 348/649 |
| 5,565,931 A | * | 10/1996 | Girod ......................... | 348/675 |
| 5,691,779 A | * | 11/1997 | Yamashita et al. .......... | 348/645 |
| 5,974,173 A | * | 10/1999 | Kimura ....................... | 382/167 |
| 6,072,526 A | * | 6/2000 | Hashimoto et al. ...... | 348/223.1 |
| 6,115,493 A | * | 9/2000 | Harrington .................. | 382/162 |
| 6,504,551 B1 | * | 1/2003 | Takashima et al. ......... | 345/649 |
| 6,721,000 B1 | * | 4/2004 | Lin et al. .................... | 382/167 |
| 6,816,610 B1 | * | 11/2004 | Beckwith .................... | 382/162 |

* cited by examiner

Primary Examiner—Colin LaRose
(74) Attorney, Agent, or Firm—Oliff & Berridge, PLC (57) ABSTRACT

An image processing device includes: a color coordinate conversion device which converts color coordinates of a color signal which has been obtained by color separation; and a two dimensional look up table which is used for correcting a chromaticity signal which has been obtained by color coordinate conversion by the color coordinate conversion device.

6 Claims, 6 Drawing Sheets

IMAGE PROCESSING DEVICE

INCORPORATION BY REFERENCE

The disclosure of the following priority application is herein incorporated by reference: Japanese Patent Application No. 2000-349071, filed Nov. 16, 2000.

BACKGROUND OF THE INVENTION

1. Field of the Invention

The present invention relates to an image processing device which performs color coordinate conversion processing upon color image data.

2. Description of the Related Art

In an image input device such as a digital camera or a scanner, or an image output device such as a color printer, or an image input and output device such as a color copier, color space conversion is performed between a color space of a color signal possessed by the device itself, and a color space of a color signal which is different from the color signal possessed by the device itself; in other words, color coordinate (or colorimetric system) conversion is performed. There are various types of color space conversion, such as one in which a color space defined by three R, G, and B color signals is converted into a color space defined by a luminance signal Y and two color difference signals Cb and Cr, and another in which the color space defined by three R, G, and B color signals is converted into a color space defined by three Cy, Mg, and Ye color signals, and the like. In this kind of color space conversion, in order to perform color reproduction in the most suitable manner, it is necessary to perform delicate chromaticity correction procedures for the chromaticity signals produced as a result of the color space conversion.

As one method of performing such a chromaticity correction procedure, there is a per se known three dimensional look up table method. In such a three dimensional look up table (LUT) method, for example, when converting from a color space specified by R-G-B to a color space specified by Cy-Mg-Ye, the Cy-Mg-Ye values which correspond to all the combinations for all the tones in R-G-B are obtained by actual measurement and are stored in a memory, and conversion from the R-G-B color space to the Cy-Mg-Ye color space is performed by addressing the memory. Since with this method the color space conversion and chromaticity correction procedure are performed based upon a colossal amount of actually measured data, it is possible to perform color reproduction of high accuracy in which the characteristics of delicate colors are taken into account, but the obverse of this is that a correspondingly colossal amount of memory capacity is required. As a result there are the problems that the scale of the circuitry becomes large and the costs mount up.

SUMMARY OF THE INVENTION

The objective of the present invention is to provide an image processing device which performs chromaticity correction during color coordinate conversion, with which color reproduction of high accuracy is possible, and which has a small-scale and economical circuit structure.

In order to attain the above objective, an image processing device according to the present invention, comprises: a color coordinate conversion device which converts color coordinates of a color signal which has been obtained by color separation; and a two dimensional look up table which is used for correcting a chromaticity signal which has been obtained by color coordinate conversion by the color coordinate conversion device.

In this image processing device, it is preferred that the two dimensional look up table, along with being used for correcting the chromaticity signal, also is used to output a luminance correction amount based upon the chromaticity signal.

Also, it is preferred that the color coordinate conversion device converts color coordinates of a color signal by matrix calculation.

Another image processing device according to the present invention comprises: a first matrix calculation device which converts a color signal which has been obtained by color separation into a luminance signal; a second matrix calculation device which converts the color signal into a chromaticity signal; a two dimensional look up table which is used for correcting the chromaticity signal which has been converted by the second matrix calculation device, and outputs a luminance correction amount based upon the chromaticity signal; and a luminance correction device which corrects the luminance signal which has been converted by the first matrix calculation device by the luminance correction amount which is outputted based upon the two dimensional look up table.

An image processing method according to the present invention comprises: a color coordinate conversion process which converts color coordinates of a color signal which has been obtained by color separation; and a two dimensional look up table process which uses a two dimensional look up table to correct a chromaticity signal which has been obtained by color coordinate conversion by the color coordinate conversion process.

An image processing method according to the present invention for converting a first color coordinates indicated by a first color signal, a second color signal and a third color signal into a second color coordinates indicated by a fourth color signal, a fifth color signal and a sixth color signal, comprises: calculating the fourth color signal using the first color signal through the third color signal; calculating the fifth color signal using the first color signal through the third color signal; calculating the sixth color signal using the first color signal through the third color signal; reading out correction values for the fourth color signal, the fifth color signal and the sixth color signal based upon the calculated fifth signal and sixth signal from a storage device where the correction values for the fourth color signal, the fifth color signal and the sixth color signal are stored and can be read out based upon the calculated fifth signal and sixth signal; and correcting the calculated fourth color signal, the calculated fifth color signal and the calculated sixth color signal based upon the correction values for the fourth color signal, the fifth color signal and the sixth color signal read out from the storage device.

In this image processing method, it is preferred that the storage device has a two dimensional look up table.

Also, it is preferred that: the first color coordinates is indicated by a color signal R, a color signal G and a color signal B; the second color coordinates is indicated by a luminance signal Y and color difference signals Cb and Cr; and the fifth signal corresponds to the color difference signal Cb and the sixth color signal corresponds to the color difference signal Cr.

A computer-readable computer program product according to the present invention contains an image processing program. The image processing program comprises: a color coordinate conversion instruction which converts color coordinates of a color signal which has been obtained by color separation; and a two dimensional look up table instruction which uses a two dimensional look up table to correct a chromaticity signal which has been obtained by color coordinate conversion by the color coordinate conversion instruction.

Another computer-readable computer program product according to the present invention contains an image processing program. The image processing program comprises: an instruction of calculating the fourth color signal using the first color signal through the third color signal; an instruction of calculating the fifth color signal using the first color signal through the third color signal; an instruction of calculating the sixth color signal using the first color signal through the third color signal; an instruction of reading out correction values for the fourth color signal, the fifth color signal and the sixth color signal based upon the calculated fifth signal and sixth signal from a storage device where the correction values for the fourth color signal, the fifth color signal and the sixth color signal are stored and can be read out based upon the calculated fifth signal and sixth signal; and an instruction of correcting the calculated fourth color signal, the calculated fifth color signal and the calculated sixth color signal based upon the correction values for the fourth color signal, the fifth color signal and the sixth color signal read out from the storage device.

It is preferred that each of the above computer-readable computer program products is a recording medium on which the image processing program is recorded.

It is preferred that each of the above computer-readable computer program products is a carrier wave in which the image processing program is embodied as a data signal.

DESCRIPTION OF THE PREFERRED EMBODIMENT(S)

In the following, the preferred embodiment of the present invention will be described with reference to the drawings.

Figure 1:
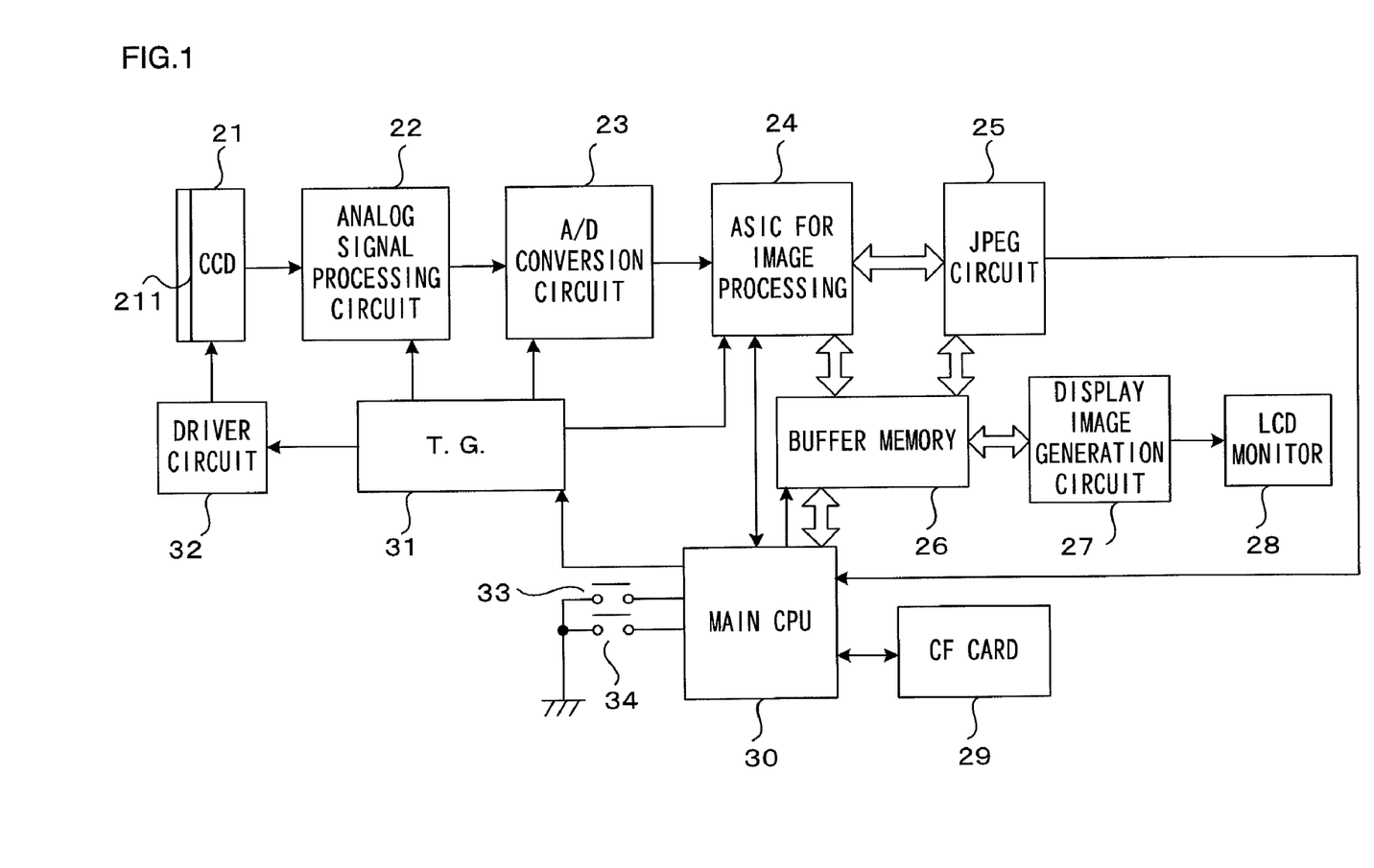
FIG. 1 is a block diagram showing the main elements of an image processing section of an electronic still camera according to a preferred embodiment of the present invention.

FIG. 1 is a block diagram showing the main elements of an image processing section of an electronic still camera according to a preferred embodiment of the present invention. In this figure, an image processing section of the camera comprises a CCD 21, an analog signal processing circuit 22, an A/D conversion circuit 23, an ASIC for image processing 24, a JPEG circuit 25, a buffer memory 26, a display image generation circuit 27, an LCD monitor 28, a CF card 29, a main CPU 30, a timing signal generator (hereinafter termed "TG") 31, and a driver circuit 32. Furthermore a half press switch 33 and a full press switch 34, which are actuated by a release button not shown in the figures, are connected to the CPU 30.

When a half press actuation signal is inputted to the CPU 30 from the half press switch 33, the CPU 30 drive controls the CCD 21, which is an image-capturing device, via the TG 31 and the driver circuit 32. The operational timings of the analog signal processing circuit 22, the A/D conversion circuit 23, and the ASIC for image processing 24 are controlled by the output signal from the TG 31. Furthermore, the CPU 30 performs focus adjustment of a photographic lens not shown in the figures based upon the focal adjustment state of said photographic lens as detected by an AF device also not shown in the figures, and performs a specified exposure calculation based upon the luminance or brightness of the subject to be photographed as detected by a photometric device not shown in the figures either.

When, following the actuation signal of the half press switch 33, an actuation signal from the full press switch 34 is inputted to the CPU 30, then the light from the subject of photography which is incident through the photographic lens is focused upon the CCD 21. This CCD 21 accumulates signal charges according to the luminance of the light from the subject of photography which is incident. A color filter 211 is provided over the pixel region of the CCD 21. The signal charges which have been accumulated in the CCD 21 are extracted by the driver circuit 32 and are inputted to the analog signal processing circuit 22. This analog signal processing circuit 22 comprises an AGC circuit and a CDS circuit, and performs analog signal processing such as gain control, noise reduction and the like upon the analog image signal. The A/D conversion circuit 23 then converts the analog image signal after this analog processing into a digital signal. The signal which is now in digital format is fed to the ASIC for image processing 24, and is subjected to image pre-processing such as outline correction and gamma correction and the like. The image data after this pre-processing is temporarily stored in the memory 26, which is a buffer memory.

This image data after pre-processing which is temporarily stored in the memory 26 is processed into image data for display by the display image generation circuit 27, and is displayed as the result of photography upon an external monitor such as the LCD monitor 28.

Furthermore, format processing (image post-processing) for JPEG compression is performed by the ASIC for image processing 24 upon this image data upon which the above described image pre-processing has been performed. The image data of the image after post-processing is data compressed at a specific compression ratio according to the JPEG compression method by the JPEG encoder/decoder circuit 25. This image data which has been subjected to compression according to the JPEG method is recorded in the memory 29 which is a removable recording medium such as a flash memory etc. (a PC card or a CF card or the like) with a predetermined file name affixed to it, by the CPU 30.

The JPEG circuit 25 may, for example, perform the data compression process in the following steps (1) through (6).

(1) A target compression ratio (amount of data after compression) is determined according to a picture quality setting to be used for compression which is set in advance (for example FINE, NORMAL, or BASIC).

(2) The image data, which consists of luminance Y and color differences Cb and Cr, is divided up into blocks each of which has approximately 8×8 pixels. Furthermore, a DCT (discrete cosine transform) is performed upon each of the blocks into which the image data has been divided up, so as to obtain conversion coefficients which correspond to 8×8 discrete spatial frequencies.

(3) A reference quantization table is prepared in which resolutions are defined at quantizations corresponding to each of the 8×8 conversion coefficients, and this reference quantization table is multiplied by a predetermined coefficient, so as to obtain a quantization table to be actually used.

(4) Using the quantization table which was obtained by (3), each of the 8×8 conversion coefficients is quantized.

(5) The data after quantization is encoded by variable length encoding or run-length encoding or the like, and is compressed.

(6) If the size after compression is outside the target compression ratio range, the value of the coefficient is adjusted and corrected, and then the procedural flow returns to the above described step (3). On the other hand, if the size after compression is within the target compression ratio range, the image compression is terminated.

The luminance signal Y and the color difference signals Cb and Cr used during image compression are color signals which define a color space (Y-Cb-Cr) which expresses the colors of the photographic subject of which this image has been captured by the electronic still camera. The color filter 211 which is provided over the pixel region of the CCD 21, for example, may be a color separation filter of the Bayer type in which red R, green G, and blue B color filter elements which correspond to the pixels of the CCD 21 are arranged in a checkered pattern. In this case, the colors of the photographic subject are defined in an R-G-B color space according to the color signals which have been captured through the various color filter elements upon the color filter 211, which are R-G-B signals. Thus, during the above described format processing, the ASIC for image processing 24 performs a conversion from the R-G-B color space to a Y-Cb-Cr color space, and calculates a luminance signal Y and color difference signals Cb and Cr.

Figure 2:
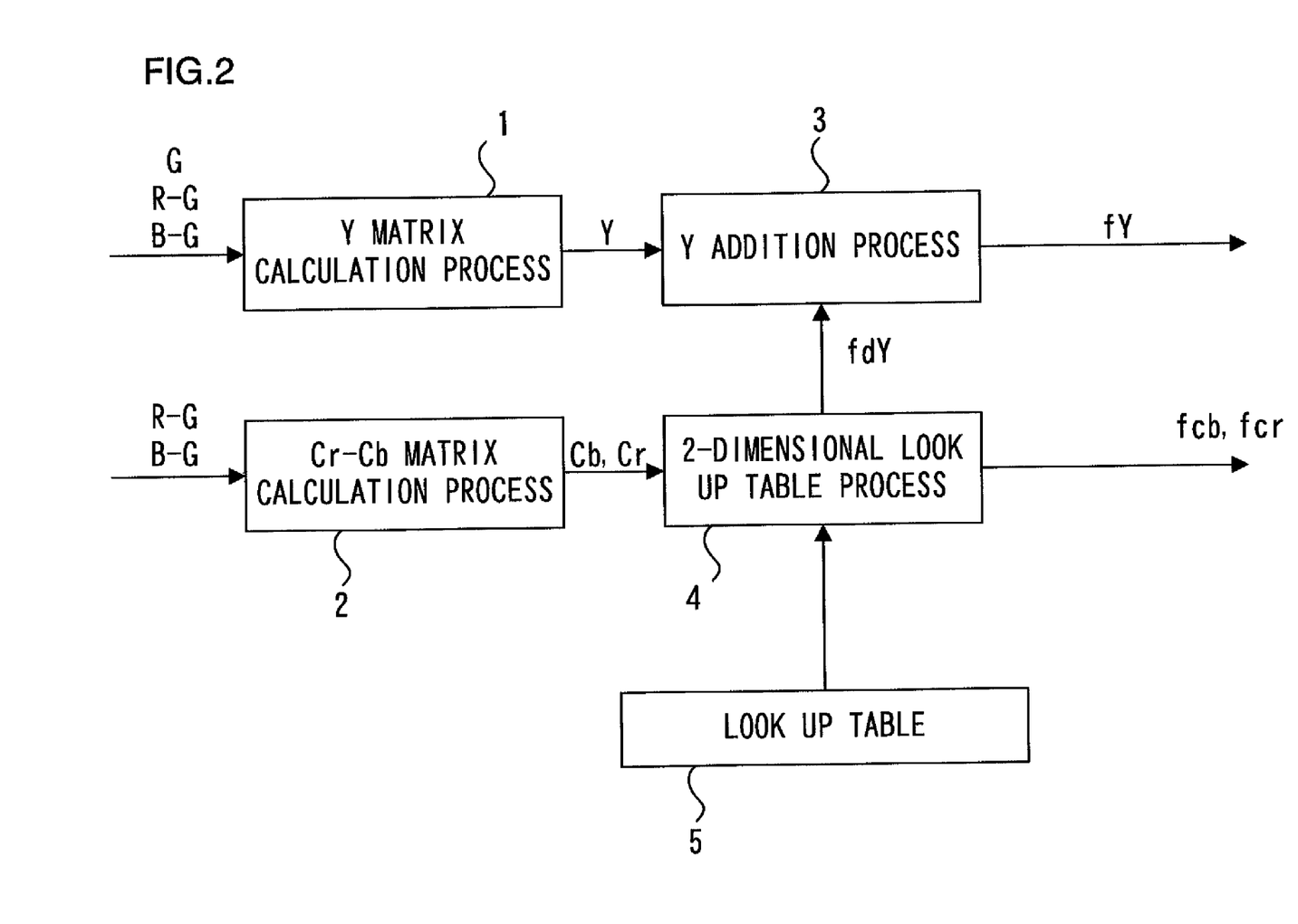
FIG. 2 is a figure for explanation of the color space conversion procedure.

FIG. 2 is a figure for explanation of the color space conversion procedure. The color space conversion may be referred to as the color coordinates conversion or the colorimetric system conversion. Referring to FIG. 2, the G signal, a (R-G) signal, and a (B-G) signal are inputted to a Y matrix calculation process 1, which outputs a luminance signal Y. Moreover, the (R-G) signal and the (B-G) signal are inputted to the Cr-Cb matrix calculation process 2, which outputs the color difference signals Cb and Cr. A Y addition process 3 adds a luminance correction amount fdY which will be explained hereinafter to the luminance signal Y which is outputted from the Y matrix process 1, and outputs a luminance signal fY after correction. And a two dimensional look up table process 4 corrects the color difference signals Cb and Cr which are outputted by the Cb-CR matrix calculation process 2 and outputs color difference signals fCb and fCr after correction, and also outputs the above mentioned luminance correction amount fdY to the Y addition process 3. A look up table 5 is used by the two dimensional look up table process 4.

This preferred embodiment is distinguished by the feature that the color space conversion is performed on the R-G-B signal using matrix calculation, and the Y-Cb-Cr signals after this color space conversion are corrected using the two dimensional look up table. This electronic still camera captures an image of the subject to be photographed, and, for example, records it as data according to the JPEG format. An image in data which has been recorded by this electronic still camera may be outputted to a display device such as an LCD or CRT display, or an output device such as a printer. At this time, it is very important how the colors of the photographic subject are reproduced. In particular, it gives a favorable impression if the colors of the photographic subject are reproduced as colors which are close to the colors as seen by the human eye. Accordingly, when performing the color space conversion, not only is the color space conversion performed so as simply to bring the values equal to the theoretical values, but also correction is performed so that the colors of the subject of photography which are reproduced after color space conversion are agreeable ones.

The method for the matrix conversion from the R-G-B color space to the Y-Cb-Cr color space is given by the following Equations (1) and (2).

$$[Y] = [Mkg \ Mkrl \ Mkbl] \begin{bmatrix} G \\ R-G \\ B-G \end{bmatrix} \quad (1)$$

$$\begin{bmatrix} Cb \\ Cr \end{bmatrix} = \begin{bmatrix} Mkr2 & Mkb2 \\ Mkr3 & Mkb3 \end{bmatrix} \begin{bmatrix} R-G \\ B-G \end{bmatrix} \quad (2)$$

Here, Mkg, Mkr1, Mkb1, Mkr2, Mkb2, Mkr3, and Mkb3 are conversion coefficients. The procedure according to the above Equation (1) corresponds to the Y matrix calculation process 1 of FIG. 2, while the procedure according to the above Equation (2) corresponds to the Cb-Cr matrix calculation process of the same figure.

Figure 3:
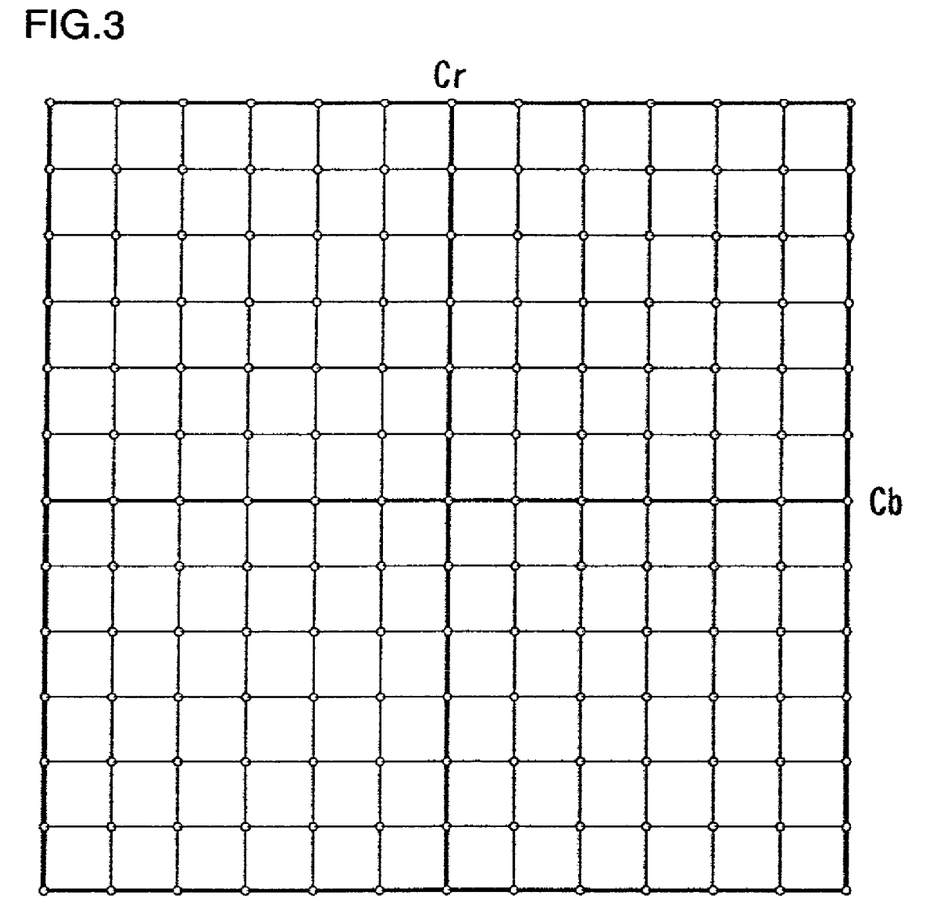
FIG. 3 is a figure for explanation of a look-up table.

FIG. 3 is a figure for explanation of the look-up table 5. In this figure Cb is shown along the horizontal axis, while Cr is shown along the vertical axis. This look up table 5 contains conversion data which is stored discretely for each of the lattice intersection points 0. The look up table 5 consists of three sub-tables as conversion data: a sub-table for Cb, in which values of fCb after correction are stored; a sub-table for Cr, in which values of fCr after correction are stored; and a sub-table for dY, in which luminance correction values fdY are stored. The color difference signals Cb and Cr which are outputted by the Cb-Cr matrix calculation process 2 are inputted as arguments to each of these sub-tables, and values for fCb, fCr, and fdY are respectively outputted from each of these sub-tables.

Various types of conversion data are stored in the look up table 5 for correcting the Cb and Cr signals and the luminance signal Y after the color space conversion process, so as, for example, to reduce the luminance of blue colors in photographs of scenery, to freshen the red colors of tomatos or the like, to brighten the green colors of fresh greenery, and to increase the luminance of flesh tones in portrait photographs. These various types of conversion data can be obtained by various experiments and simulations. When performing color correction using this look up table 5, it is possible to perform correction of the luminance and the hue separately for each of the specified colors shown in the color difference signals Cb and Cr, as contrasted with the case in which the color correction is performed by matrix calculation.

Figure 4:
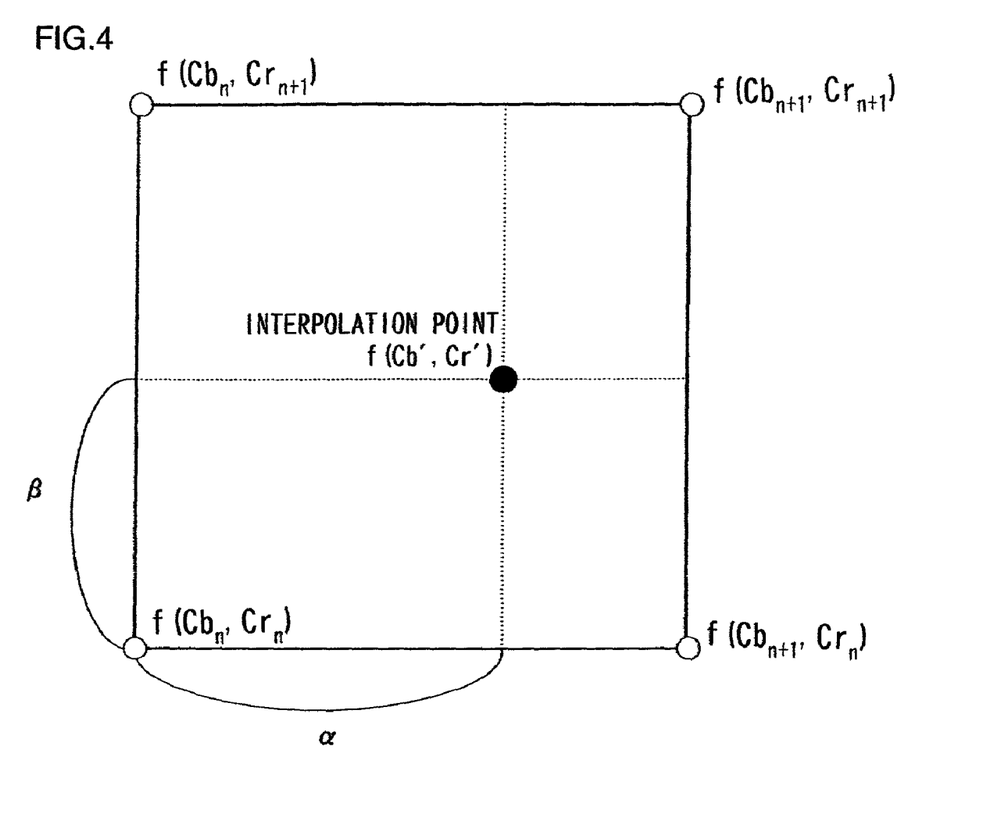
FIG. 4 is a figure for explanation of an interpolation calculation.

If conversion data is required for a point which is not one of the lattice points in FIG. 3, an interpolation calculation is performed using the conversion data for the four neighboring lattice points. FIG. 4 is a figure for explanation of this interpolation calculation, and shows one of the lattice squares of FIG. 3 in magnified view. In FIG. 4, the data value at the upper left lattice point of this lattice square is termed f(Cbn, Crn+1), the data value at the lower left lattice point of this lattice square is termed f(Cbn, Crn), the data value at the upper right lattice point of this lattice square is termed f(Cbn+1, Crn+1), and the data value at the lower right lattice point of this lattice square is termed f(Cbn+1, Crn). If the position of the interpolation point is (α, β), the data value f(Cb', Cr') at the interpolation point is calculated according to the following Equation (3):

$$f(Cb', Cr') = f(Cbn, Crn)*(1-\alpha)*(1-\beta) + \\ f(Cbn+1, Crn)*\alpha*(1-\beta) + \\ f(Cbn, Crn+1)*(1-\alpha)*\beta + \\ f(Cbn+1, Crn+1)*\alpha*\beta \quad (3)$$

where α, β are values normalized at the lattice pitch.

The luminance signal fY which is outputted by the Y addition process 3 is calculated according to the following Equation (4):

$$fY = Y + fdY \quad (4)$$

where Y is the luminance signal which is outputted by the Y matrix calculation process 1, and fdY is the luminance correction value which is outputted by the two dimensional look up table process 4 described above.

Figure 5:
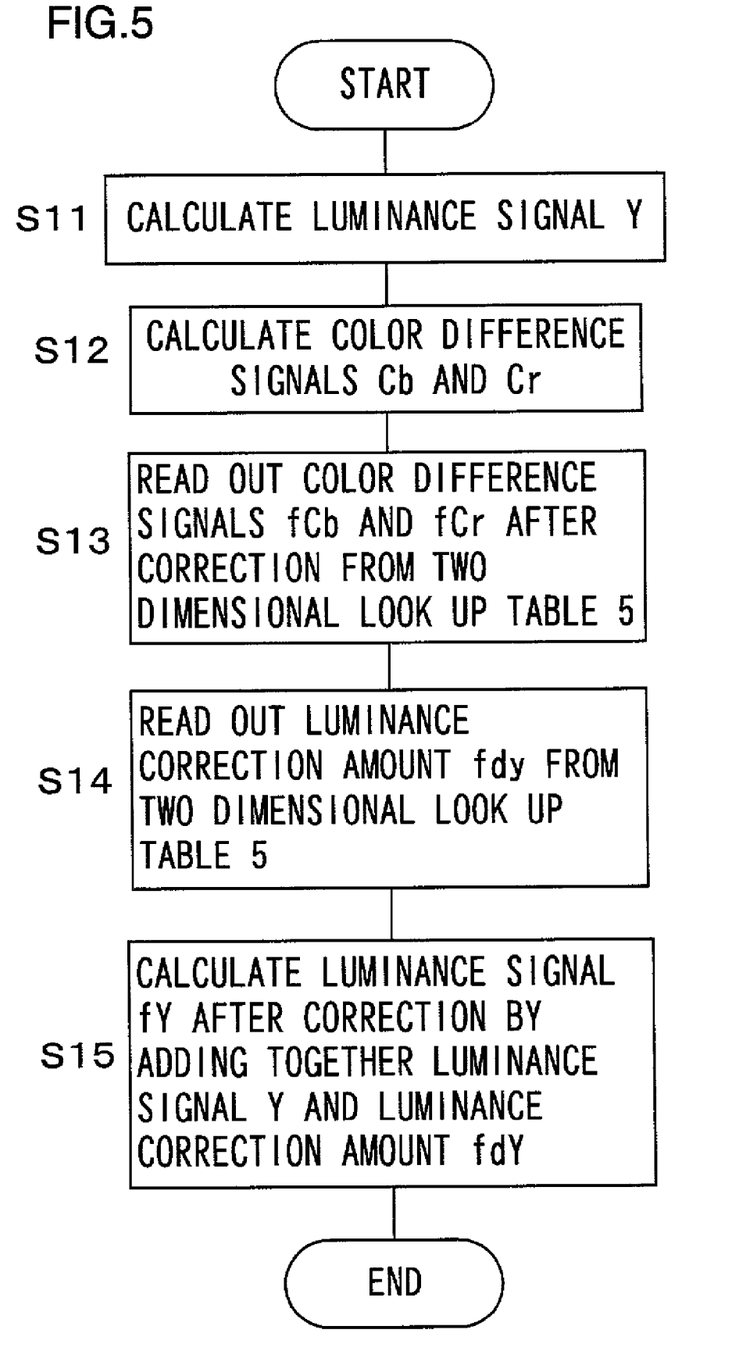
FIG. 5 is a flow chart showing the flow of a color space conversion procedure.

FIG. 5 is a flow chart showing the flow of the above described color space conversion procedure. This flow chart is executed by the ASIC for information processing 24 during color space conversion. In a step S11 of FIG. 5, the ASIC for information processing 24 calculates the luminance signal Y by performing the matrix calculation described in the above Equation (1). In the next step S12, the ASIC for information processing 24 calculates the color difference signals Cb and Cr by performing the matrix calculation described in the above Equation (2). In the next step S13, the ASIC for information processing 24 reads out the color difference signals fCb and fCr after correction from the two dimensional look up table 5 by using the color difference signals Cb and Cr as arguments.

In the next step S14, the ASIC for information processing 24 reads out the luminance correction amount fdY from the two dimensional look up table 5 by using the color difference signals Cb and Cr as arguments. And in the final step S15, the ASIC for information processing 24 calculates the luminance signal after correction by using the above described Equation (4); and then the procedure of FIG. 5 terminates.

The ASIC for information processing 24 performs color conversion from the color space defined by R-G-B to the color space defined by Y-Cb-Cr as explained above, by calculating the luminance signal Y and the color difference signals Cb and Cr, and then correcting each of these signals. The JPEG circuit 25 performs data compression according to the JPEG method at the specified compression ratio, using the luminance signal fY which has been corrected and the color difference signals fCb and fCy after correction.

According to the preferred embodiment of the present invention as described above, the following beneficial effects are obtained.

(1) Accurate color space conversion is performed according to the matrix calculation processes 1 and 2 so as to bring the values to be equal to the theoretical values, and the color difference signals fCb and fCr are obtained by the two dimensional look up table process 4 by correcting the color difference signals Cb and Cr after the color space conversion. Since according to the present invention the color space conversion is not performed using any look up table, it is possible to avoid the generation of ripple phenomena which is caused because the values in the look up tables are provided discretely. Furthermore, since it is arranged to use the matrix calculation procedures according to the above described Equations (1) and (2) for all the colors, the generation of discontinuities, which are generated when the calculation equations would be changed to according to color, does not occur; in other words, the color difference signals after color space conversion do not become discontinuous in the boundary portions where the calculation equations would be changed. Furthermore, the result of correcting the color difference signals Cb and Cr after color space conversion is that it is possible to reproduce colors which give a favorable impression. Since at this time the two dimensional look up table process 4 only performs correction, it is very hard for ripple phenomena (such as occur when performing the color space conversion by look up table) to be generated, and it is possible to obtain a color image of high quality.

(2) The two dimensional look up table process 4 outputs the color difference signals fCb and fCr after correction and the luminance correction amount fdY based upon the color difference signals Cb and Cr after the color space conversion procedure. The Y addition process 3 adds this luminance correction amount fdY to the luminance signal Y after the color space conversion which has been obtained by the matrix calculation process 1, and outputs the result as the luminance signal fY after correction. As a result it is possible to obtain a color image of high quality, since it is possible to correct the luminance and the hue for each specified color which is given by the color difference signals Cb and Cr (3) The look up table 5 is made to be of two dimensional structure, and it is arranged to perform linear interpolation according to the above described Equation (3) on a portion where data corresponding to the color difference signals Cb and Cr are not stored. Not only does this two dimensional look up table 5 not require the enormous memory space which is required by a three dimensional look up table, but also it is possible to reduce the amount of data which is stored in the look up table on the premise of performing the linear interpolation procedure. As a result benefits with regard to reduction of size and cost are obtained, since it is possible to implement the look up table 5 with a small amount of circuitry.

Although by way of example, in the above explanation of color space conversion, the case was discussed of converting from a color space defined by R-G-B to a color space defined by Y-Cb-Cr, it is also possible to apply the present invention to conversion from an RGB space to a YIQ space, from an RGB space to a YUV space, from an RGB space to an XYZ space, from an RGB space to a CyMgYe space, from an RGB space to an Lab space, from an RGB space to a Lch space, or the like. Furthermore, apart from these possibilities, it is also possible to apply the present invention to the color space conversion processes in the reverse directions to the ones mentioned above, or indeed to the case of mutual conversion between any color space and any other color space. It should be understood that, in the case of conversion from a RGB space to the above described YIQ space, Y is left as Y, just as it is. Further, in the case of conversion from an RGB space to the above described YUV space, Y is left as Y, just as it is. In the case of conversion from an RGB space to the above described Lab space, Y is converted to L just as it is. Similarly, in the case of conversion from an RGB space to the above described Lch space, Y is converted to L just as it is.

Furthermore although, by way of example, in the above explanation, an addition process was shown as being the luminance correction means which corrected the luminance signal Y by a luminance correction amount fdY, the present invention is not to be considered as being limited to the use of an addition process; for example, it would also be possible to utilize a multiplication process. In such a case of using a multiplication process, the corrected result would be strongly obtained by multiplying the input luminance signal by a luminance correction amount.

Although the preferred embodiment of the present invention has been shown and described in terms of its application to an electronic still camera, the present invention can likewise be applied to an image input device such as a scanner, to an image output device such as a color printer, or to an image input and output device such as a color copier or the like.

Furthermore, it would also be possible to store such a color space conversion procedure as exemplified by the above described electronic still camera in the form of software as a program for image processing upon a recording medium such as a CD-ROM or a floppy disk or the like, and, by reading this program into a personal computer or the like, to use it when performing color space conversion of image data or the like; such use should be understood as coming within the scope of the present invention.

Instead of reading out the above described program for image processing using a personal computer or the like from a recording medium upon which said program is recorded, it would also be possible to transmit this program for image processing by using a transmission medium such as the internet. In this case, the transmitted program for image processing would be loaded into a personal computer or the like, and a process of color space conversion as described above would be performed by the personal computer or the like upon the image data.

Figure 6:
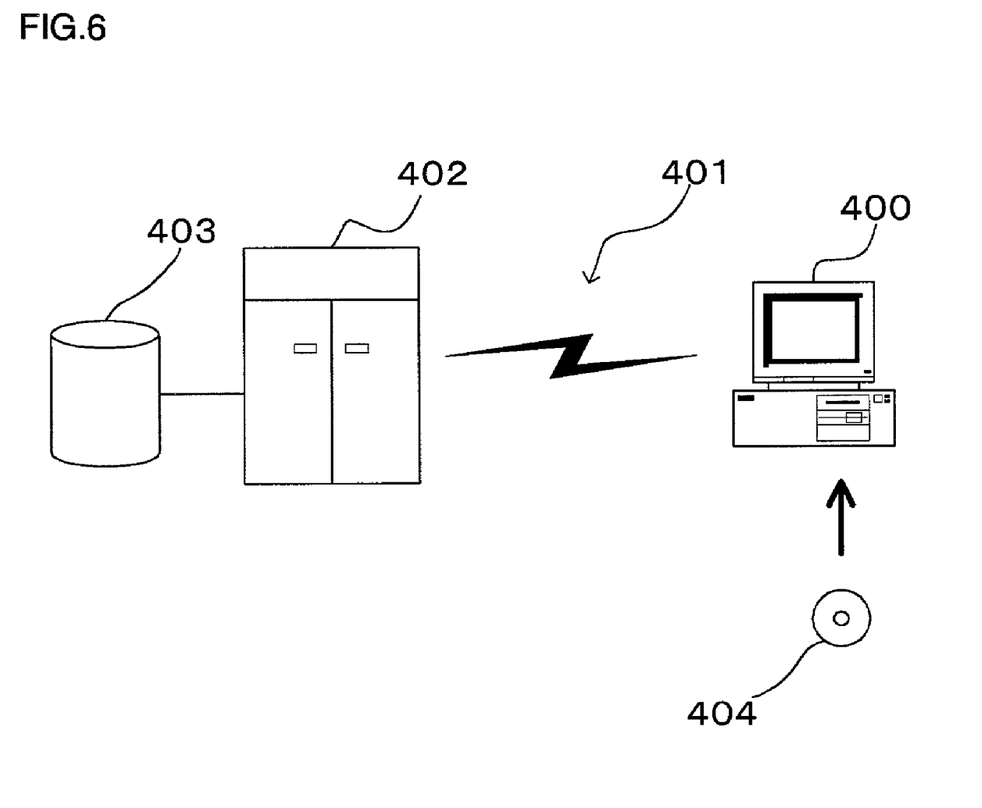
FIG. 6 is a figure illustrating that a program is provided to a personal computer.

FIG. 6 illustrates how a program is provided to a personal computer. The personal computer 400 receives the program via a CD-ROM 404. The personal computer 400 has a function of connecting with a telecommunication line 401. A computer 402 is a server computer which provides the program mentioned above and stores the program in a recording medium such as a hard disk 403. The telecommunication line 401 may be a transmission medium for connection with the Internet, for personal computer communication or the like or it may be a dedicated telecommunication line. The computer 402 reads out the program stored in the hard disk 403, and transmits the program to the personal computer 400 via the telecommunication line 401. In other words, the program is embodied in a carrier wave as a data signal and is transmitted via the telecommunication line 401. Thus, the program is provided as various kinds of computer-readable computer program product, such as a recording medium, a carrier wave and the like.

What is claimed is:

1. An electronic still camera comprising:
   an image-capturing device that captures an image of a subject and outputs signals under first color coordinates comprising a plurality of color components;
   an image processing device that performs image processing on the signals output from the image-capturing device; and
   the image processing device including a color coordinate conversion unit that converts the signals output from the image-capturing device into signals under second color coordinates comprising a luminance component and color difference components, and a color difference signal correction unit that receives signals corresponding to the color difference components, and outputs corrected signals corresponding to the color difference components and a correction amount for a signal corresponding to the luminance component by using a two dimensional look-up table based upon the received signals corresponding to the color difference components,
   wherein the two dimensional look-up table outputs the corrected signals corresponding to the color difference components and the correction amount for the signal corresponding to the luminance component when the received signals corresponding to the color difference components are input as arguments.

2. An electronic still camera according to claim 1, wherein the color coordinate conversion unit converts the signals under the first color coordinates into the signals under the second color coordinates by matrix calculation.

3. An electronic still camera according to claim 1, further comprising:
   the image processing device including a luminance signal correction unit that corrects the signal corresponding to the luminance component with the correction amount and outputs a corrected signal corresponding to the luminance component;
   a compression unit that compresses the corrected signal corresponding to the luminance component and the corrected signals corresponding to the color difference components to generate compressed image signals; and
   a recording unit that records the compressed image signals.

4. An electronic still camera according to claim 1, wherein when the two dimensional look up table does not store data corresponding to the received signals, the color difference signal correction unit performs linear interpolation to generate the data corresponding to the received signals.

5. An image processing method used in an electronic still camera, the method comprising:
   capturing an image of a subject with an image-capturing device;
   outputting signals under first color coordinates comprising a plurality of color components from the image-capturing device;
   converting the signals output from the image-capturing device into signals under second color coordinates comprising a luminance component and color difference components; and
   outputting corrected signals corresponding to the color difference components and a correction amount for a signal corresponding to the luminance component by using a two dimensional look-up table based upon the converted signals corresponding to the color difference components,
   wherein the two dimensional look-up table outputs the corrected signals corresponding to the color difference components and the correction amount for the signal corresponding to the luminance component when the converted signals corresponding to the color difference components are input as arguments.

6. A computer-readable medium that stores an image processing program for controlling an electronic still camera, the image processing program comprising instructions to:

capture an image of a subject with an image-capturing device;

output signals under first color coordinates comprising a plurality of color components from the image-capturing device;

convert the signals output from the image-capturing device into signals under second color coordinates comprising a luminance component and color difference components; and output corrected signals corresponding to the color difference components and a correction amount for a signal corresponding to the luminance component by using a two dimensional look-up table based upon the converted signals corresponding to the color difference components, wherein the two dimensional look-up table outputs the corrected signals corresponding to the color difference components and the correction amount for the signal corresponding to the luminance component when the converted signals corresponding to the color difference components are input as arguments.

* * * * *